(12) United States Patent
Natzke

(10) Patent No.: US 11,526,265 B2
(45) Date of Patent: *Dec. 13, 2022

(54) VISUAL MANIPULATION OF A DIGITAL OBJECT

(71) Applicant: Adobe Inc., San Jose, CA (US)

(72) Inventor: Erik Jon Natzke, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,756

(22) Filed: Mar. 18, 2021

(65) Prior Publication Data

US 2021/0208768 A1 Jul. 8, 2021

Related U.S. Application Data

(63) Continuation of application No. 16/373,489, filed on Apr. 2, 2019, now Pat. No. 11,023,113.

(51) Int. Cl.
| | |
|---|---|
| *G06F 3/04845* | (2022.01) |
| *G06T 19/20* | (2011.01) |
| *G06F 3/0488* | (2022.01) |
| *G06F 3/04815* | (2022.01) |
| *G06F 3/04883* | (2022.01) |

(52) U.S. Cl.
CPC ........ *G06F 3/04845* (2013.01); *G06F 3/0488* (2013.01); *G06F 3/04815* (2013.01); *G06F 3/04883* (2013.01); *G06T 19/20* (2013.01); *G06F 2203/04808* (2013.01)

(58) Field of Classification Search
CPC ............ G06F 3/04845; G06F 3/04815; G06F 3/0488; G06F 3/04883; G06F 2203/04808; G06T 19/20
See application file for complete search history.

(56) References Cited

U.S. PATENT DOCUMENTS

| | | | |
|---|---|---|---|
| 9,202,297 B1 | 12/2015 | Winters et al. | |
| 9,324,188 B1* | 4/2016 | Fram | G06F 3/0412 |
| 2007/0247435 A1* | 10/2007 | Benko | G06F 3/0488 |
| | | | 345/173 |
| 2011/0041098 A1* | 2/2011 | Kajiya | G06F 3/04815 |
| | | | 345/173 |

(Continued)

OTHER PUBLICATIONS

"Final Office Action", U.S. Appl. No. 16/373,489, filed Aug. 10, 2020, 23 pages.

(Continued)

*Primary Examiner* — Roberto Borja
(74) *Attorney, Agent, or Firm* — FIG. 1 Patents

(57) ABSTRACT

Visual manipulation of a digital object such as three-dimensional digital object manipulation on a two-dimensional display surface is described that overcomes the challenges of explicit specification of axis manipulation for each of the three axes one at a time. In an example, a multipoint gesture to a digital object is received on a display surface, which generates an axis of manipulation based on a position of the multipoint gesture relative to the digital object. Then a manipulation gesture is recognized, indicative of a manipulation of the digital object relative to the axis of manipulation, and a visual manipulation of the digital object about the axis of manipulation is generated based on the manipulation gesture.

20 Claims, 12 Drawing Sheets

(56) References Cited

U.S. PATENT DOCUMENTS

| | | | |
|---|---|---|---|
| 2013/0222385 A1* | 8/2013 | Dorsey | G06T 15/005 345/427 |
| 2014/0129990 A1* | 5/2014 | Xin | G06F 3/0425 715/849 |
| 2015/0026619 A1 | 1/2015 | Lee et al. | |
| 2015/0077352 A1 | 3/2015 | Ma | |
| 2020/0319776 A1 | 10/2020 | Natzke | |

OTHER PUBLICATIONS

"First Action Interview Office Action", U.S. Appl. No. 16/373,489, filed Apr. 15, 2020, 5 pages.
"Notice of Allowance", U.S. Appl. No. 16/373,489, filed Nov. 12, 2020, 12 pages.
"Pre-Interview First Office Action", U.S. Appl. No. 16/373,489, filed Mar. 4, 2020, 5 pages.

* cited by examiner

VISUAL MANIPULATION OF A DIGITAL OBJECT

RELATED APPLICATIONAS

This application is a continuation of and claims priority to U.S. pat. app. Ser. No. 16/373,489, filed 2 Apr. 2019 and titled "Visual Manipulation of a Digital Object," the disclosure of which is incorporated in its entirety by reference herein.

BACKGROUND

Manipulating three-dimensional (3D) digital objects on a two-dimensional (2D) display surface is a desired and common operation, particularly when producing 3D animation. Conventional graphics systems, however, provide non-intuitive processes for such manipulation that involve multiple manual steps, such as for determining an axis of manipulation and then performing the manipulation itself. For instance, some conventional techniques require explicit specification of a manipulation axis, one dimension at a time, and then a subsequent explicit manipulation to input the desired manipulation itself. Other conventional techniques provide manipulation via separate sliders or similar affordances for each of the three dimensions in a 3D space. Thus, such existing techniques are multi-step processes, where the axis of manipulation must be specified, one dimension at a time, and then the actual manipulation of the object must be input. Such approaches are not intuitive and are difficult for a user to discover and navigate. In addition, they lack the ability to fine tune a manipulation axis during a manipulation operation. Accordingly, existing approaches for manipulating three-dimensional (3D) digital objects on a two-dimensional (2D) display surface require time consuming multi-step processes that are not user friendly and intuitive, and thus waste user and machine resources when enabling such manipulations.

SUMMARY

Visual manipulation of a digital object is described, such as manipulation of a 3D digital object on a 2D display surface, that overcomes the challenges of explicit specification of an axis of manipulation for each of the three dimensions, one at a time. In an example, a two point touch then spread gesture is used to generate an axis of rotation and then a simple single finger swipe perpendicular to the generated axis will roll a digital object in the direction of the swipe, similar to rolling a pencil along a surface.

To do so, a user touches two points on a 3D digital object displayed on a 2D display surface. The user then spreads their fingers apart promoting a heads up (HU) display and exposing increasing levels of complex manipulation depending on the proximity of the spreading fingers. In an example embodiment, the spreading gesture generates an axis line between the fingers and across a plane of the digital object. Depending on the size of the spreading gesture, a specific manipulation mode is activated, such as a rotation mode, and the axis of manipulation is f. The HU display can provide the user with an indication of the manipulation mode. The user may remove their fingers and using a recognized manipulation gesture indicative of a manipulation of the digital object relative to the axis of manipulation, manipulate the digital object about the axis. For example, in a rotation mode a single point swiping gesture perpendicular to the axis of manipulation will roll or rotate the object around the axis of manipulation in the direction of the swiping gesture. When the rotation is complete, the user may retouch the ends of the generated axis of manipulation and by bringing their fingers together along the axis, unlock the axis and terminate the manipulation mode.

Visual manipulation of a digital object is described herein primarily with respect to a manipulation mode determined to be a rotation mode for a 3D digital object on a 2D display surface. However, this is by way of example and not limitation. Techniques of visual manipulation of a digital object can also be used for any manipulation about an axis of a digital object on a display surface including but not limited to a folding mode, bending mode, creasing mode and the like. Alternately or in addition, multiple modes may be combined, for example first a creasing mode is initiated and a digital object is creased at the axis of manipulation, then a rotation mode is initiated to rotate the object around the axis of manipulation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
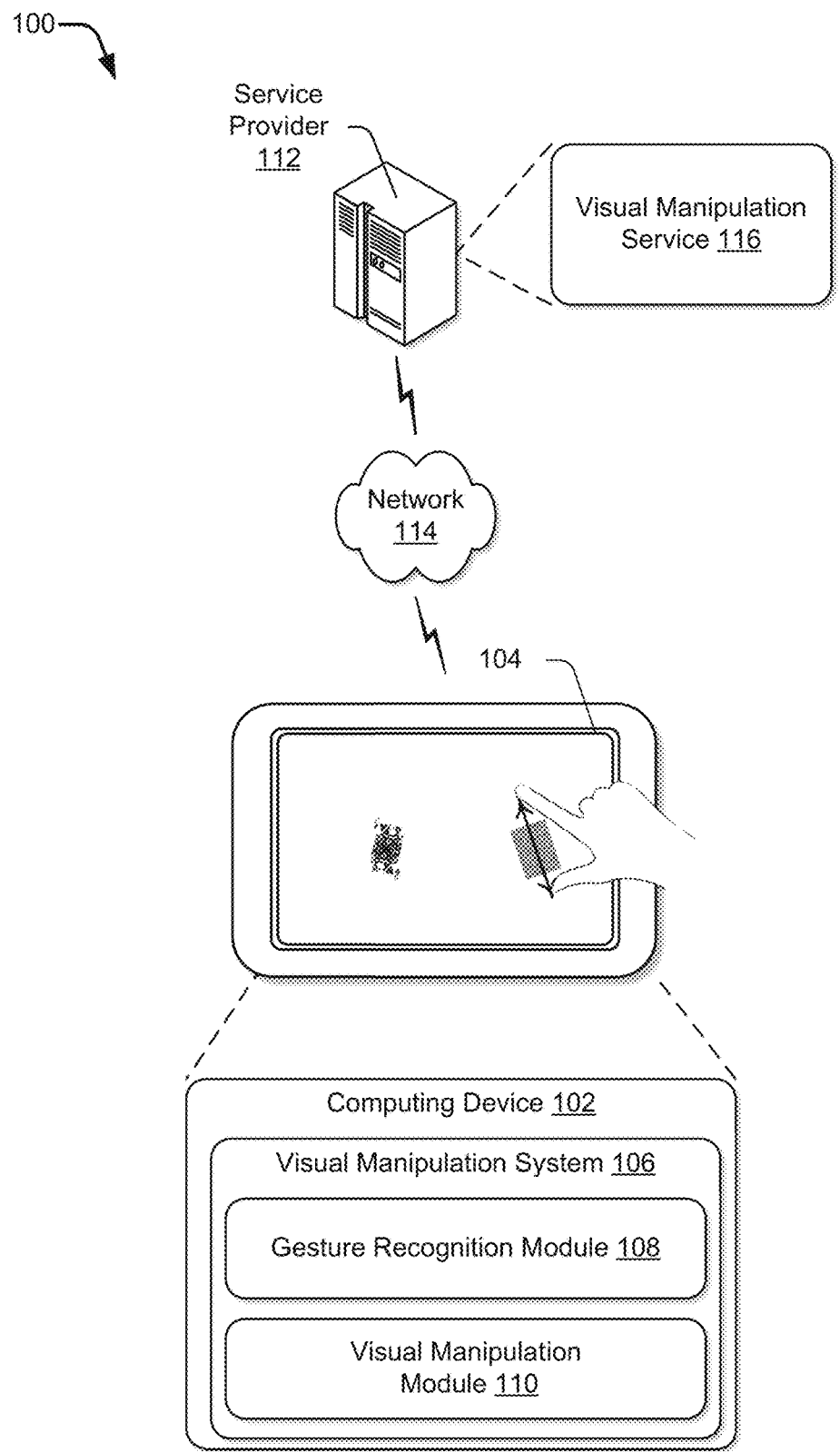
FIG. 1 is an illustration of an environment in an example implementation that is operable to employ visual manipulation of a digital object described herein.

Manipulating 3D digital objects on a 2D display surface is an increasingly desirable feature in many software application packages. For example, manipulation of a 3D digital object on a 2D display surface is typically leveraged when producing 3D animation. However, conventional techniques require explicit specification of a manipulation axis, one dimension at a time, then an explicit rotation dialog to input the desired manipulation itself. Further, these approaches are not very intuitive and do not feel natural, as they do not incorporate the fine motor skills of the human hand, but instead require tedious multistep inputs. In addition, they lack the ability to fine tune the axis of manipulation during the manipulation operation. Thus, conventional approaches are burdensome on user and machine resources.

Accordingly, visual manipulation of a digital object is described that overcomes the challenges of explicit specification of an axis of manipulation and allows for complex manipulation to be carried out in a very multi-touch friendly intuitive way. The degree of manipulation can easily be adjusted by using the fine-grained hand control humans naturally have, and the axis of manipulation can be adjusted by simply specifying another pair of touch points. In implementation, a two point touch and spread gesture is used to generate an axis of manipulation. A manipulation gesture may then be recognized that is indicative of a manipulation of the digital object relative to the axis of manipulation. A visual manipulation of the digital object about the axis of manipulation is then generated based on the manipulation gesture applied according to the activated manipulation mode.

For example, when a 3D digital object is displayed on a 2D display surface, a user touches two points with two fingers within a plane of the 3D digital object, these two points may be referred to as points A and B. A vector is created from A to B and is generated on the screen as a visible representation of the axis of manipulation. As the user moves their fingers around, the points are rearranged on the plane of the digital object and the axis AB is updated. When the user spreads their fingers apart along AB, the interface updates and the object goes into a manipulation mode dependent on the size of the spreading gesture, or distance created between A and B. When the size reaches a particular distance and the spreading gesture stops, points A and B are locked and the mode of manipulation is activated. To unlock the axis of manipulation and terminate the activated mode of manipulation, the user simply retouches points A and B, and moves their fingers together along AB, at which point A and B can be repositioned and relocked for another manipulation session if desired. To prevent the digital object from immediately being manipulated, for example rolling immediately when in rotation mode, before the axis has been exactly placed, the width of the axis on the screen is to be used to enable or disable manipulation modes.

In rotation manipulation mode, moving the fingers perpendicular to AB applies a rotation to the digital object along the projected AB axis in the direction of the perpendicular movement. The rolling distance is coupled to the amount of perpendicular travel of the fingers. Any other movement, apart from the aforementioned move to bring the touch points closer together, will rotate the object along an axis that is perpendicular to the object plane and centered around the midpoint of the AB axis.

When the desired rotation is complete, the user can retouch points A and B and by bringing their fingers together along the AB axis, the axis of manipulation is unlocked and the generated visible representation of the axis of manipulation disappears upon removal of the fingers from the points A and B, completing a manipulation sequence.

Thus, in contrast with conventional techniques for visual manipulation of objects, the techniques described herein reduce the machine interactions and user inputs required for visual manipulation, providing a marked improvement over conventional techniques.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ visual manipulation of a digital object. The illustrated environment 100 includes a computing device 102 including a display surface 104. The computing device 102 is equipped with a visual manipulation system 106 that embodies a gesture recognition module 108 and a visual manipulation module 110 to implement corresponding functionality described herein. Generally, the visual manipulation system 106 is representative of functionality to recognize different gestures and to perform different visual manipulations of digital objects based on the recognized gestures.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operation "over the cloud" as described in FIG. 12.

In operation, the gesture recognition module 108 may be executed to recognize touch input gestures received by the display surface 104 of computing device 102. For example, consider that a user touches two points on the display surface 104 relative to a digital object and moves their fingers apart in a spreading gesture. The gesture recognition module 108 recognizes the spreading gesture and accordingly generates an axis of manipulation relative to the digital object and activates a manipulation mode for manipulating the digital object relative to the axis. While in the manipulation mode, the user inputs a manipulation gesture to the display surface 104 indicative of a command to visually manipulate the digital object relative to the generated axis of manipulation. Accordingly, the gesture recognition module 108 recognizes the manipulation gesture, and causes the visual manipulation module 110 to generate a corresponding visual manipulation of the digital object relative to the axis of manipulation. For example, a swiping finger gesture made perpendicular to the axis of manipulation, when in a rotation mode, will initiate a rotation of the digital object about the axis of manipulation. In a further implementation, the user brings their fingers together in a contracting gesture relative to the generated axis of manipulation. The gesture recognition module 108 recognizes the contracting gesture and unlocks the manipulation mode and terminates the manipulation sequence.

As indicated above, when the gesture recognition module 108 recognizes the manipulation gesture, the visual manipulation module 110 generates the corresponding visual manipulation of the digital object based on the manipulation gesture applied according to the activated manipulation mode. For example, continuing the above example of the rotation mode, when the finger swipe gesture perpendicular to the axis of manipulation is made, the gesture recognition module 108 recognizes this gesture as a request for rotation about the axis of manipulation and communicates a corresponding notification to the visual manipulation module 110. In response, the visual manipulation module 110 will then display the corresponding visual manipulation in accordance with the active manipulation mode. For instance, in a rotation mode, the digital object will rotate around the axis of manipulation in the direction of the swiping gesture.

The environment 100 further depicts a service provider 112, configured to communicate with the computing device 102 over a network 114, such as the Internet, to provide a "cloud-based" computing environment. The service provider 112 is further illustrated as including a visual manipulation service 116. Generally, the visual manipulation service 116 may be configured to perform functionality that is described herein in relation to the visual manipulation system 106, such as a web-based service. Further, the visual manipulation service 116 may be configured to distribute the gesture recognition module 108 and the visual manipulation module 110 for downloading over the network 114.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Systems and Techniques

The following discussion describes example implementation scenarios and procedures for visual manipulation of a digital object. Aspects of each of the scenarios and procedures may be implemented in hardware, firmware, software, or a combination thereof. The procedures are shown as a set of blocks that specify operations performed by one or more devices and are not necessarily limited to the orders shown for performing the operations by the respective blocks.

Figure 2:
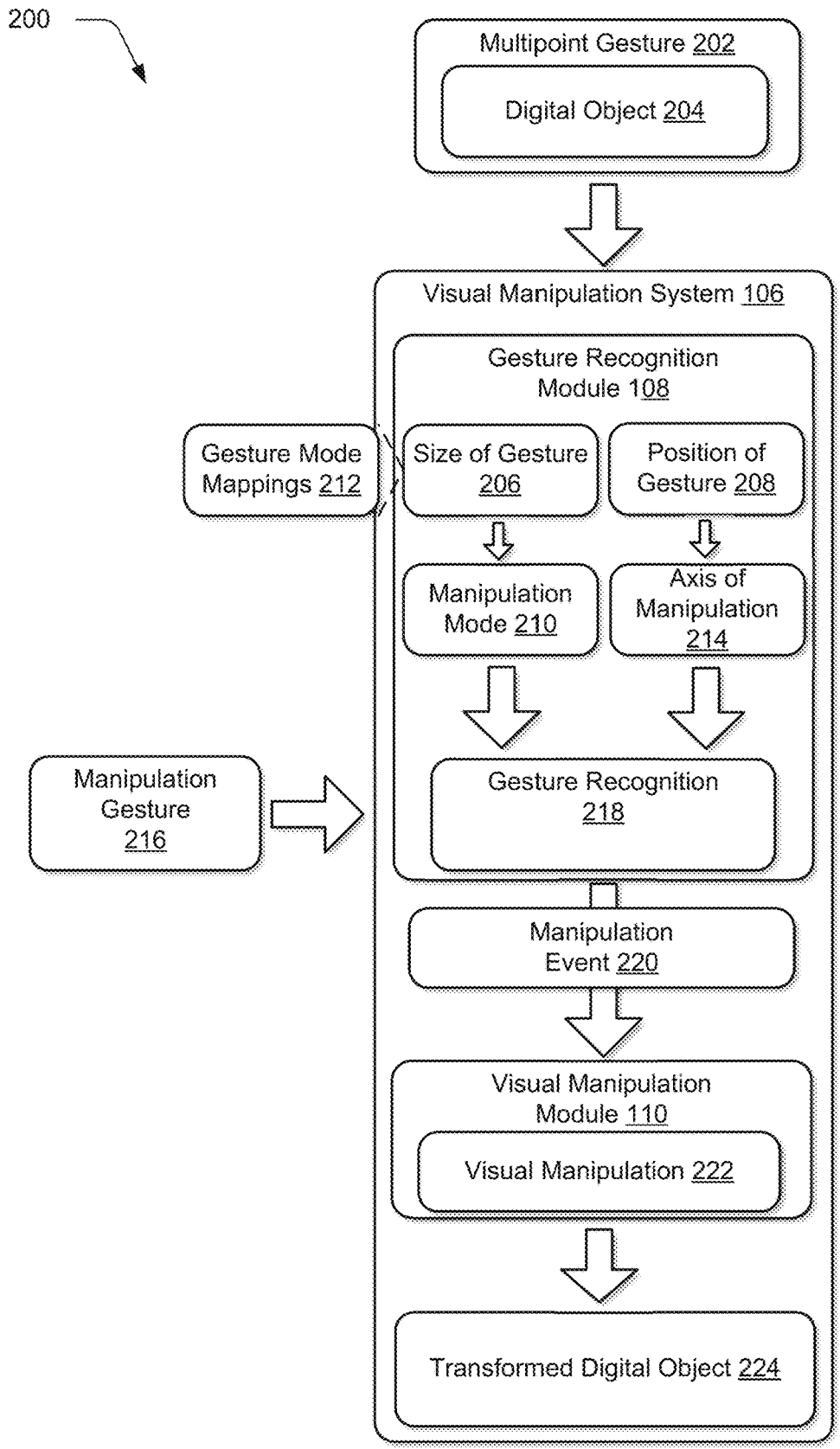
FIG. 2 depicts an example implementation scenario including an overview of an example architecture and process implementing visual manipulation of a digital object.

FIG. 2 depicts an implementation scenario 200 including an overview of an example architecture and process for performing techniques for visual manipulation of a digital object. In the scenario 200, a user inputs a multipoint gesture 202 relative to a digital object 204, such as on the display surface 104 of the computing device 102. The multipoint gesture 202, for instance, is applied to the digital object 204 itself, and/or adjacent the digital object 204. The gesture recognition module 108 detects the multipoint gesture 202, and determines a size 206 of the multipoint gesture 202 and a position 208 of the multipoint gesture 202 in relation to the digital object 204. Based on the size 206 of the multipoint gesture 202, the gesture recognition module 108 activates a manipulation mode 210 that correlates to the size 206 of the gesture. For instance, the gesture recognition module 108 maintains gesture mode mappings 212 that represent data that maps different gesture sizes to different manipulation modes. Thus, to activate the manipulation mode 210, the gesture recognition module 108 correlates the gesture size 206 to the manipulation mode 210 in the gesture mode mappings 212. Generally, the gesture size 206 may be determined in various ways, such as in pixels, screen distance on the display surface 104 (e.g., in millimeters), percentage of the display surface 104 spanned by the multipoint gesture 202, and so forth. Further, an axis of manipulation 214 for the digital object 204 is generated based on the position 208 of the multipoint gesture 202 relative to the digital object 204.

After the manipulation mode 210 is activated and the axis of manipulation 214 is generated, a manipulation gesture 216 is received from the user. The user, for instance, applies the manipulation gesture 216 to the display surface 104. The gesture recognition module 108 detects the manipulation gesture 216 and performs a gesture recognition 218 which recognizes the manipulation gesture 216 as being indicative of a manipulation of the digital object 204 relative to the axis of manipulation 214 and according to the manipulation mode 210. Accordingly, the gesture recognition module 108 generates a manipulation event 220 and communicates the manipulation event 220 to the visual manipulation module 110. Generally, the manipulation event 220 includes data that specifies parameters to be applied for manipulating the digital object 204. For instance, the manipulation event 220 specifies a type of visual manipulation to be applied to the digital object 204 based on the manipulation mode 210, such as rotation, folding, wrapping, and/or other type of visual manipulation. The manipulation event 220 may also specify an amount of visual manipulation to be applied to the digital object 204, such as a degree of rotation, an angle of folding, how tightly the digital object 204 is to be wrapped about the axis of manipulation 214, and so forth.

Further to the scenario 200, the visual manipulation module 110 receives the manipulation event 220 and applies a visual manipulation 222 to the digital object 204 to generate a transformed digital object 224 according to the parameters specified by the manipulation event 220. The digital object 204, for instance, is transformed based on a type of visual manipulation specified by the manipulation mode 210 and an amount of manipulation specified by the manipulation event 220 to generate the transformed digital object 224. In at least some implementations, the transformed digital object 224 is then displayed on the display surface 104 of the computing device 102.

Figure 3:
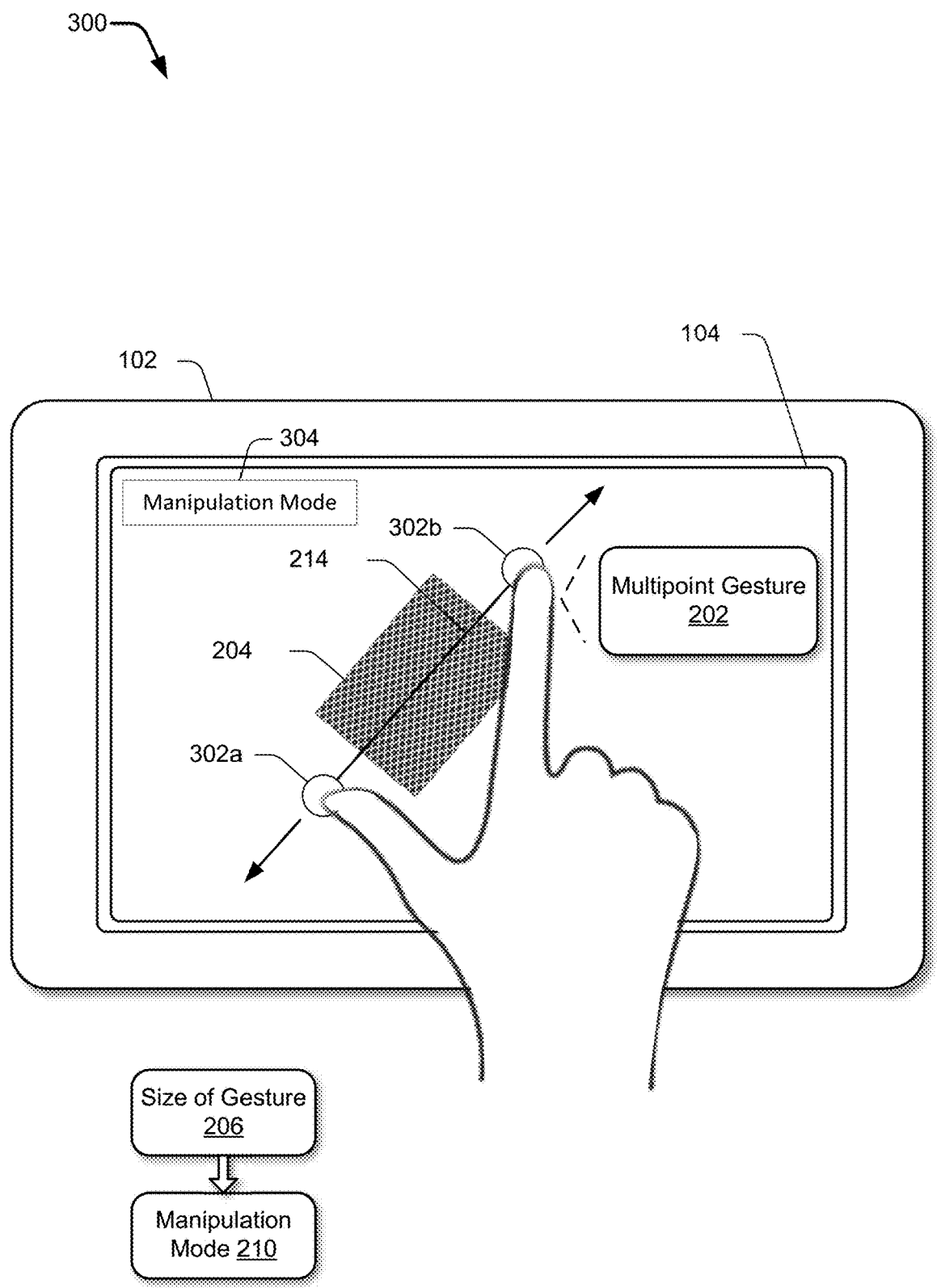
FIG. 3 depicts an example implementation scenario for activating a manipulation mode and generating an axis of manipulation.
Figure 4:
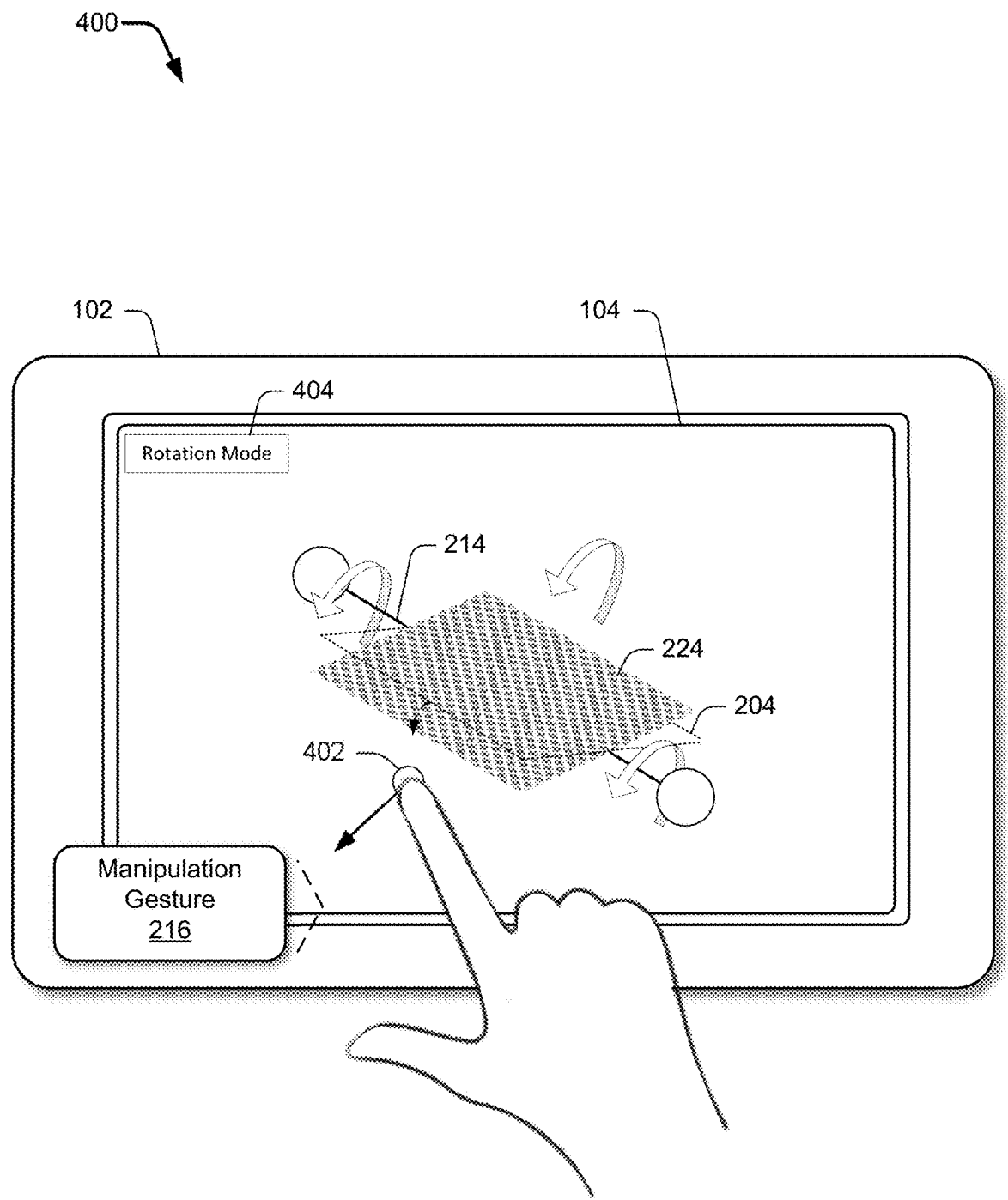
FIG. 4 depicts an example implementation scenario for recognizing a manipulation gesture and generating a visual manipulation of a digital object about an axis of manipulation.

FIGS. 3 and 4 depict example scenarios that provide detailed operations of aspects of visual manipulation of a digital object. Generally, different aspects of the scenarios can be performed by the visual manipulation system 106. The scenarios, for instance, represent visual implementations of the scenario 200 described above.

FIG. 3 depicts an example scenario 300 for inputting a multipoint gesture to activate a manipulation mode and generate the axis of manipulation referenced above. The scenario 300 depicts a user applying touch input to the display surface 104 to generate the multipoint gesture 202. The multipoint gesture 202, for instance, is applied overlaying and/or adjacent to the digital object 204 displayed on the display surface 104. In this particular example, the multipoint gesture 202 is applied with two fingers (e.g., a thumb and a forefinger) at points 302a and 302b of the display surface 104 and by moving the fingers in opposite directions in a spreading gesture. As the user spreads their fingers apart relative to (e.g., across) the digital object 204 to generate the multipoint gesture 202, the axis of manipulation 214 is generated between the fingers. Further, the size 206 of the multipoint gesture 202 is determined. The size 206, for instance, is based on a distance between the user's fingers (e.g., between the thumb and forefinger) and is used to determine which manipulation mode is to be activated. In this particular example, the gesture recognition module 108 actives the manipulation mode 210 based on determining the size 206 of the multipoint gesture 202.

Further to the scenario 300, the visual manipulation system 106 displays a heads-up notification 304 that provides an indication of an active manipulation mode when a manipulation mode is activated, which in this case is the manipulation mode 210. In this example the heads-up notification 304 identifies the manipulation mode 210 via a text notification. Alternately or in addition, the heads-up notification 304 may be provided to the user by a different type of notification, such as an icon, in a user interface menu, an audible notification, a tactile notification, and so on.

FIG. 4 depicts an example scenario 400 for generating a visual manipulation of a digital object about an axis of manipulation based on a manipulation gesture applied according to the activated manipulation mode, which in this example is a rotation mode. The scenario 400, for instance, represents a continuation of the scenario 300, above. In the scenario 400, a user applies touch input to the display surface 104 of the computing device 102 to generate the manipulation gesture 216. The user, for example, applies the touch input with their finger (e.g., forefinger) at single touchpoint 402 and drags their finger in a swiping gesture perpendicular to the axis of manipulation 214 to generate the manipulation gesture 216. The gesture recognition module 108 recognizes the manipulation gesture 216 via the gesture recognition 218 and notifies the visual manipulation module 110 of the manipulation gesture 216, such as via the manipulation event 220.

As the user drags their finger, the digital object 204 rotates around the axis of manipulation 214 in the direction of the swiping gesture as shown to generate the transformed digital object 224. In addition, the amount of rotation is coupled to the distance traveled by the user's finger during the manipulation gesture 216.

Further to the scenario 400, the visual manipulation system 106 displays a heads-up notification 404 that identifies the currently active manipulation mode, i.e., a rotation mode. Similar to the heads-up notification 304, the heads-up notification 404 may take various forms including visible, audible, and/or tactile notifications.

Figure 5:
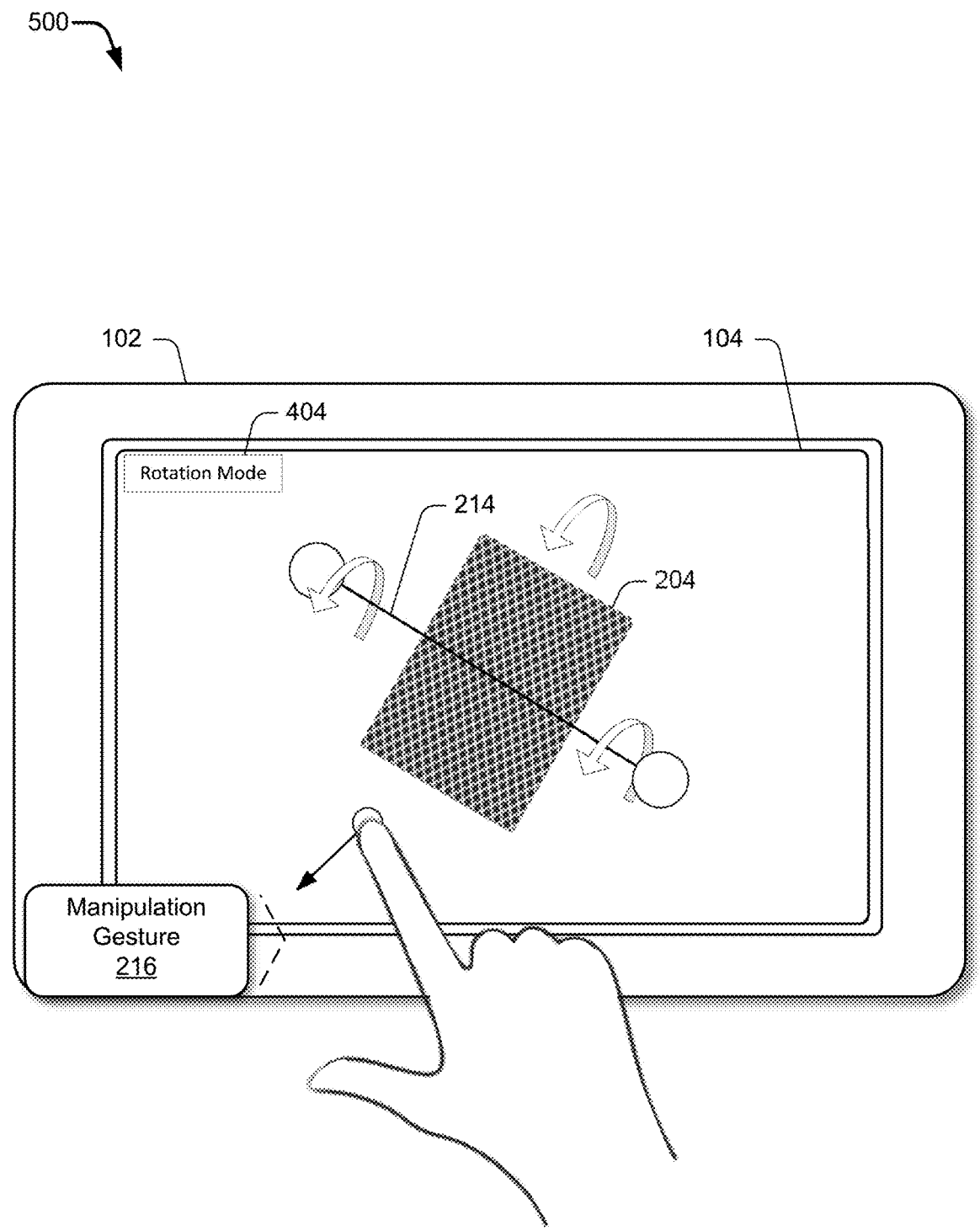
FIG. 5 depicts an example implementation scenario for generating a visual manipulation of a digital object about an axis of manipulation.

FIGS. 5, 6, 7a, 7b, 7c, and 8 depict additional example scenarios for visual manipulation of a digital object. The scenarios, for instance, represent visual implementations of the scenario 200 described above. FIG. 5 depicts an example scenario 500 which illustrates another example of the manipulation mode 210 in a rotation mode, similar to the example illustrated in FIG. 4. In the scenario 500, however, the axis of manipulation 214 has been repositioned relative to the digital object 204. As described below in the scenario 800, for instance, the axis of manipulation 214 is unlocked from its position in the scenario 400 and newly generated in the position depicted in the scenario 500. For example, in the scenario 400 above, the axis of manipulation is positioned longitudinally (e.g., is a longitudinal axis) relative to a geometry of the digital object 204. In the scenario 500, however, the axis of manipulation 214 is positioned laterally (e.g., is a lateral axis) relative to the geometry of the digital object 204.

Accordingly, in the scenario 500, the manipulation gesture 216 causes the digital object 204 to be rotated around the repositioned axis of manipulation 214 as shown.

Figure 6:
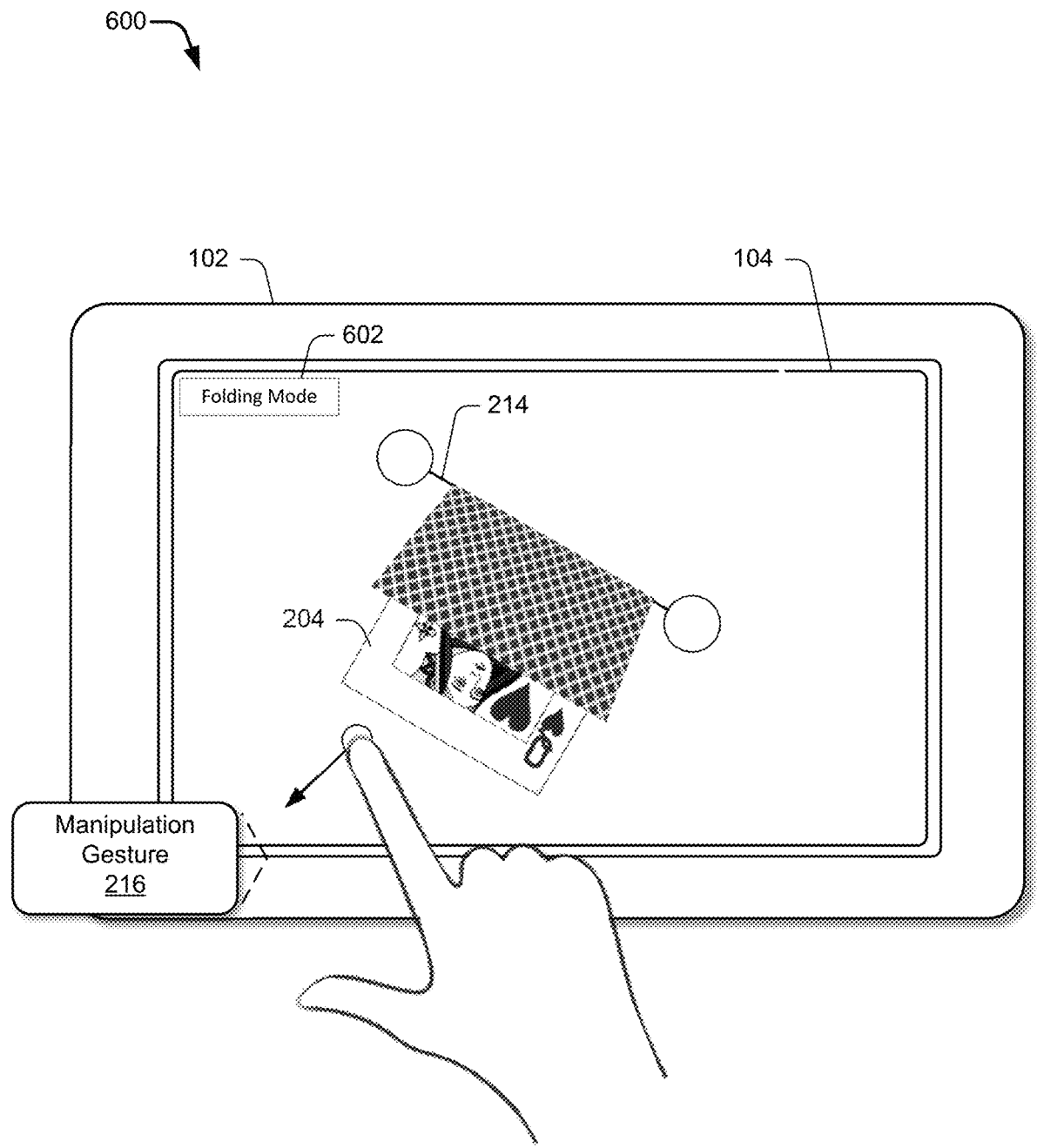
FIG. 6 depicts an example implementation scenario for generating a visual manipulation of a digital object about an axis of manipulation.

FIG. 6 depicts an example implementation scenario 600 in which a manipulation mode other than rotation is active. In the scenario 600, the manipulation mode 210 is activated as a folding mode. Accordingly, the manipulation gesture 216 causes the digital object 204 to be folded over the axis of manipulation 214 with the manipulation mode 210 activated as a folding mode. In at least one implementation, the degree to which the digital object 204 is folded about the axis of manipulation 214 is based on a length of the manipulation gesture 216 on the display surface 104. Further, a heads-up notification 602 identifies the active folding mode.

Figure 7A:
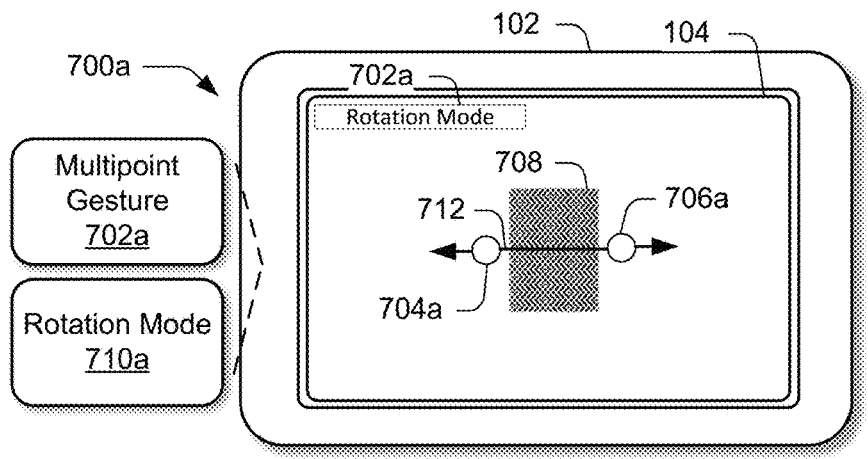
FIG. 7a depicts an example implementation scenario for activating a rotation mode based on a determination of the size of a multipoint gesture.
Figure 7B:
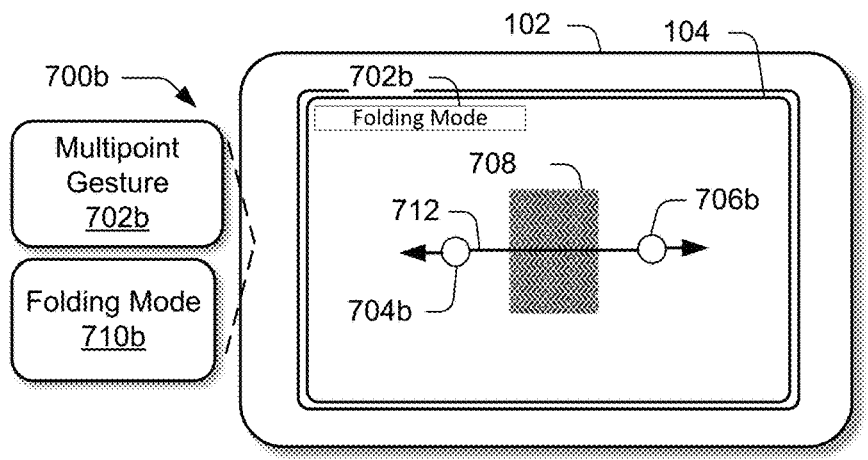
FIG. 7b depicts an example implementation scenario for activating a folding mode based on a determination of the size of a multipoint gesture.
Figure 7C:
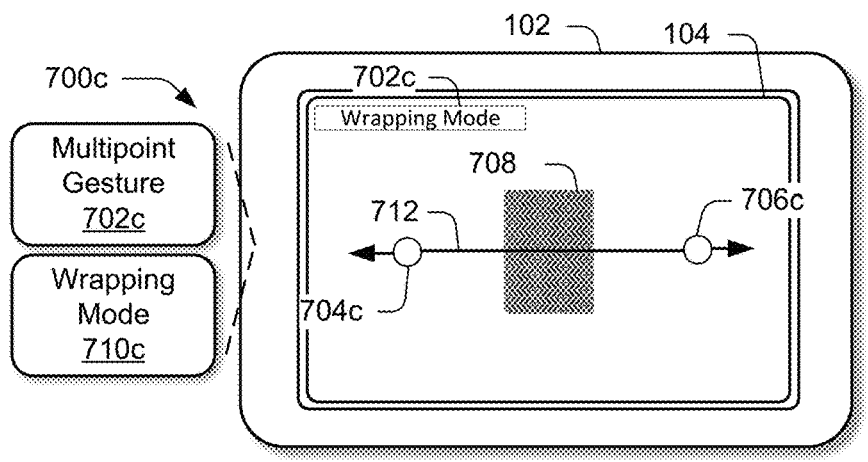
FIG. 7c depicts an example implementation scenario for activating a wrapping mode based on a determination of the size of a multipoint gesture.

In some embodiments, as a multipoint gesture increases in size, increasingly complex manipulation modes are activated. Generally, the size of a multipoint gesture is determined by the proximity of touchpoints of the gesture (e.g., fingers) to one another in the multipoint gesture. FIGS. 7a, 7b, and 7c depicts example implementation scenarios for activating different manipulation modes based on a determination of the size of a multipoint gesture.

FIG. 7a illustrates an example scenario 700a where the manipulation mode is a rotation mode that is activated based on the size of a multipoint gesture 702a. To generate the multipoint gesture 702a, a user positions two fingers at points 704a and 706a relative to (e.g., overlaying and/or adjacent) a digital object 708 and spreads them apart to activate a rotation mode 710a. Further, points 704a and 706a are spread apart across the digital object 708 generating an axis of manipulation 712. In this narrowest configuration, the size of the multipoint gesture 702a (e.g., the distance between the points 704a and 706a) is determined to activate the rotation mode 710a.

FIG. 7b illustrates an example scenario 700b where the manipulation mode is a folding mode that is activated based on a size of a multipoint gesture 702b. The multipoint gesture 702b or instance, represents a continuation of the multipoint gesture 702a. To generate the multipoint gesture 702b, a user positions two fingers at points 704b and 706b relative to the digital object 708 to activate a folding mode 710b. For instance, user placement of fingers at the points 704b and 706b represents a spreading gesture from the points 704a and 706a of the multipoint gesture 702a. In this particular example, the multipoint gesture 702b expands the axis of manipulation 712 to cause the axis of manipulation 712 to be wider than in the rotation mode 710a configuration. Generally, the size of the multipoint gesture 702b (e.g., the distance between the points 704b and 706b) causes activation of the folding mode 710b.

FIG. 7c illustrates an example scenario 700c where the manipulation mode is a wrapping mode, where the object can be wrapped or rolled up around the axis of manipulation. In the scenario 700b, a user generates a multipoint gesture 702c by positioning two fingers at points 704c and 706c relative to the digital object 708 to activate a wrapping mode 710c. The multipoint gesture 702c, for instance, represents a continuation of the multipoint gesture 702a and/or the multipoint gesture 702b. For instance, user placement of fingers at the points 704c and 706c represents a spreading gesture from the points 704b and 706b of the multipoint gesture 702b. In this particular example, the multipoint gesture 702c expands the axis of manipulation 712 to cause the axis of manipulation 712 to be wider than in the folding mode 710b configuration. Generally, the size of the multipoint gesture 702c (e.g., the distance between the points 704c and 706c) causes activation of the wrapping mode 710c.

In the wrapping mode 710c, a manipulation gesture (e.g., the manipulation gesture 216) causes the digital object 708 to wrap around the axis of manipulation 712 in a circular and/or spiral wrapping pattern. Further, while in the wrapping mode 710c, a size of a manipulation gesture determines an extent to which the digital object 708 is wrapped around the axis of manipulation 712. For instance, the longer the manipulation gesture, the tighter or more closely the digital object 708 is wrapped about the axis of manipulation 712.

Accordingly, the scenarios 700a-700c demonstrates that techniques for visual manipulation of a digital object can be employed to expose different types and/or complexities of visual manipulations. For instance, a single multipoint gesture can progressively activate different visual manipulation modes as the multipoint gesture expands and/or contracts and based on varying distances between contact points of the multipoint gesture.

Figure 8:
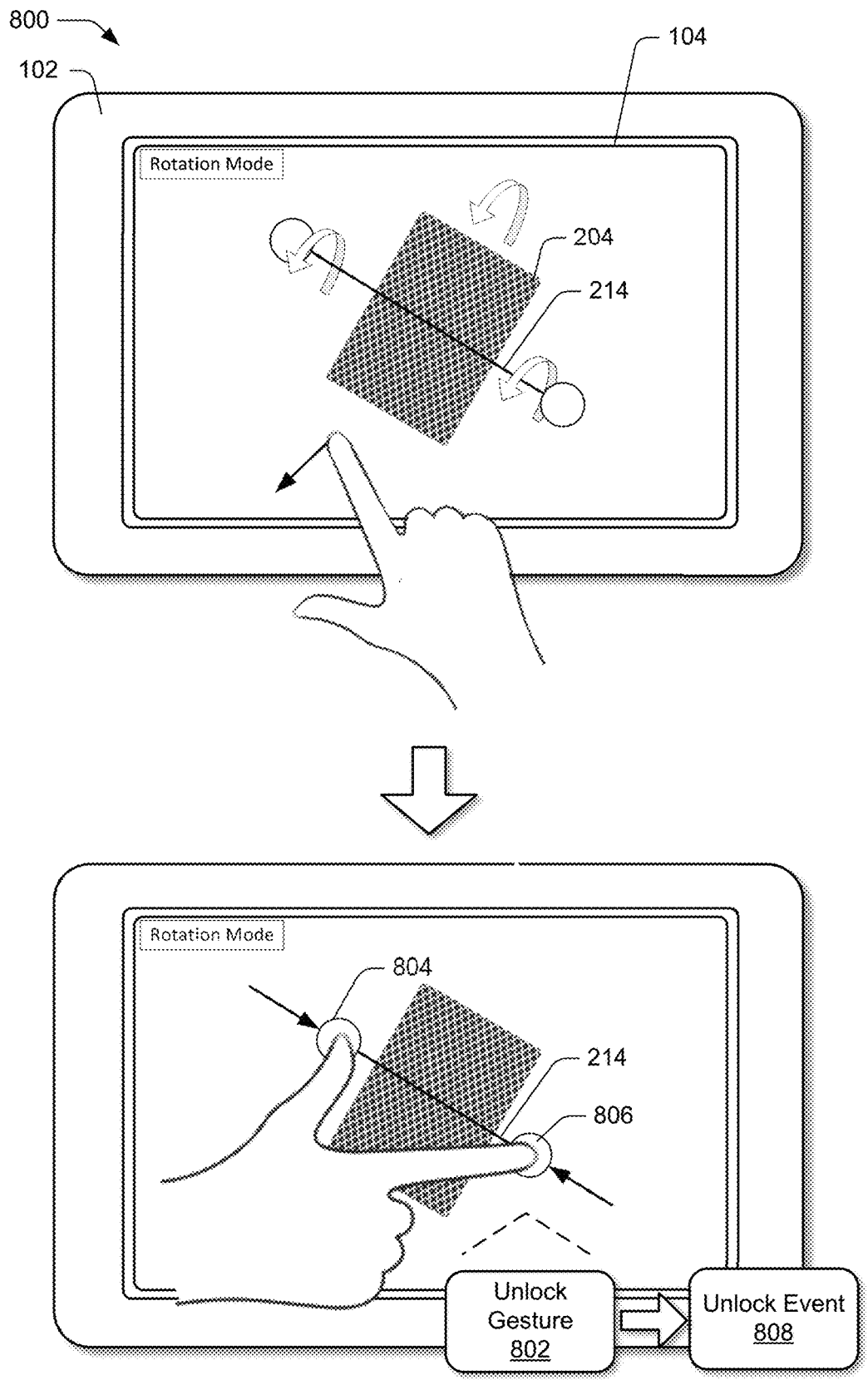
FIG. 8 depicts an example implementation scenario for unlocking an axis of manipulation and/or deactivating a manipulation mode.

FIG. 8 depicts an example implementation scenario 800 for unlocking an axis of manipulation and/or deactivating a manipulation mode. In the upper portion of the scenario 800, a rotation manipulation mode is active such that a manipulation gesture can be applied to the display surface 104 to rotate the digital object 204 about the axis of manipulation 214, such as described previously.

Proceeding to the lower portion of the scenario 800, a user applies an unlock gesture 802 to the axis of manipulation 214, such as overlaying or adjacent to the axis of manipulation 214. The unlock gesture 802 involves the user placing two fingers on a touchpoint 804 and a touchpoint 806 of the axis of manipulation 214, respectively, and contracting their fingers inward relative to the axis of manipulation 214. In response to detecting the unlock gesture 802, the gesture recognition module 108 generates an unlock event 808 which causes the axis of manipulation 214 to be unlocked from its current position such that it can be moved to a different position relative to the digital object 204. Alternatively or additionally, the unlock event 808 causes the axis of manipulation 214 to be removed and the current manipulation mode to be deactivated.

Example Procedures

Figure 9:
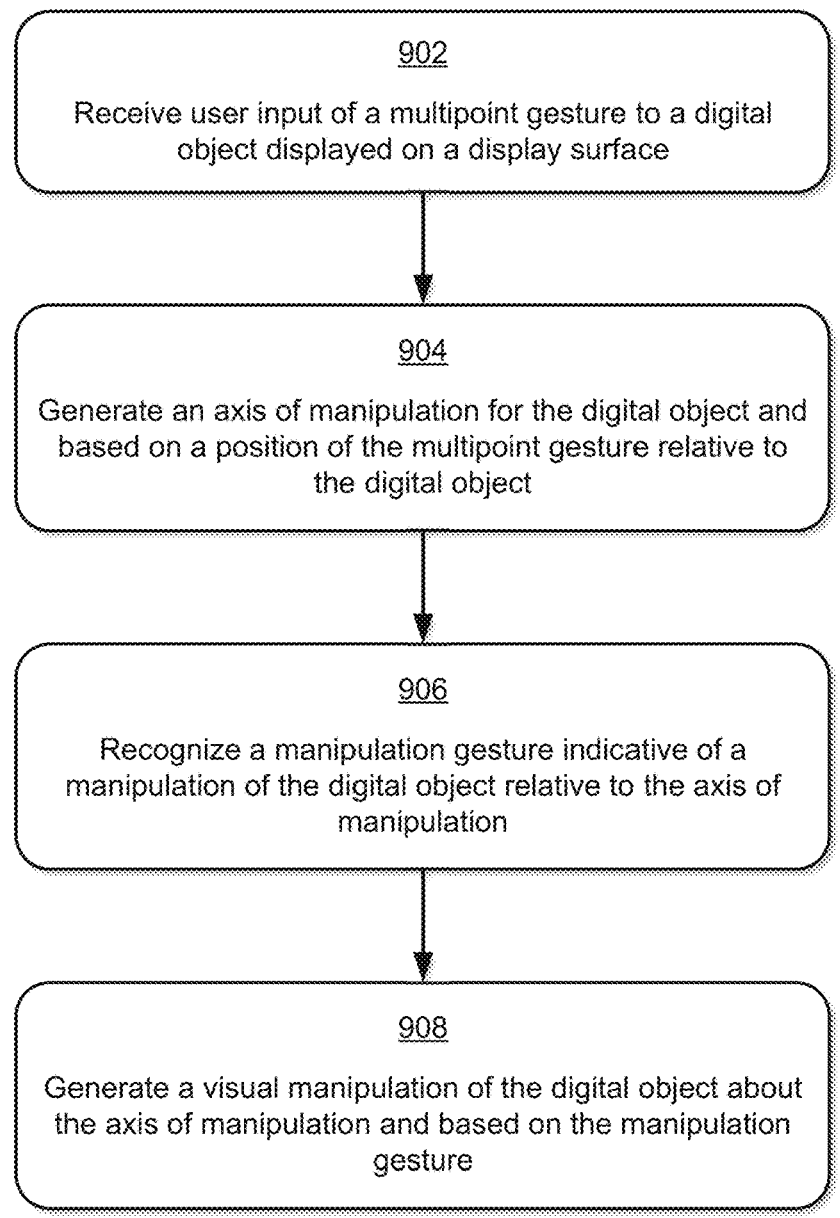
FIG. 9 depicts a procedure in an example implementation for generating a visual manipulation of a digital object about an axis of manipulation.
Figure 10:
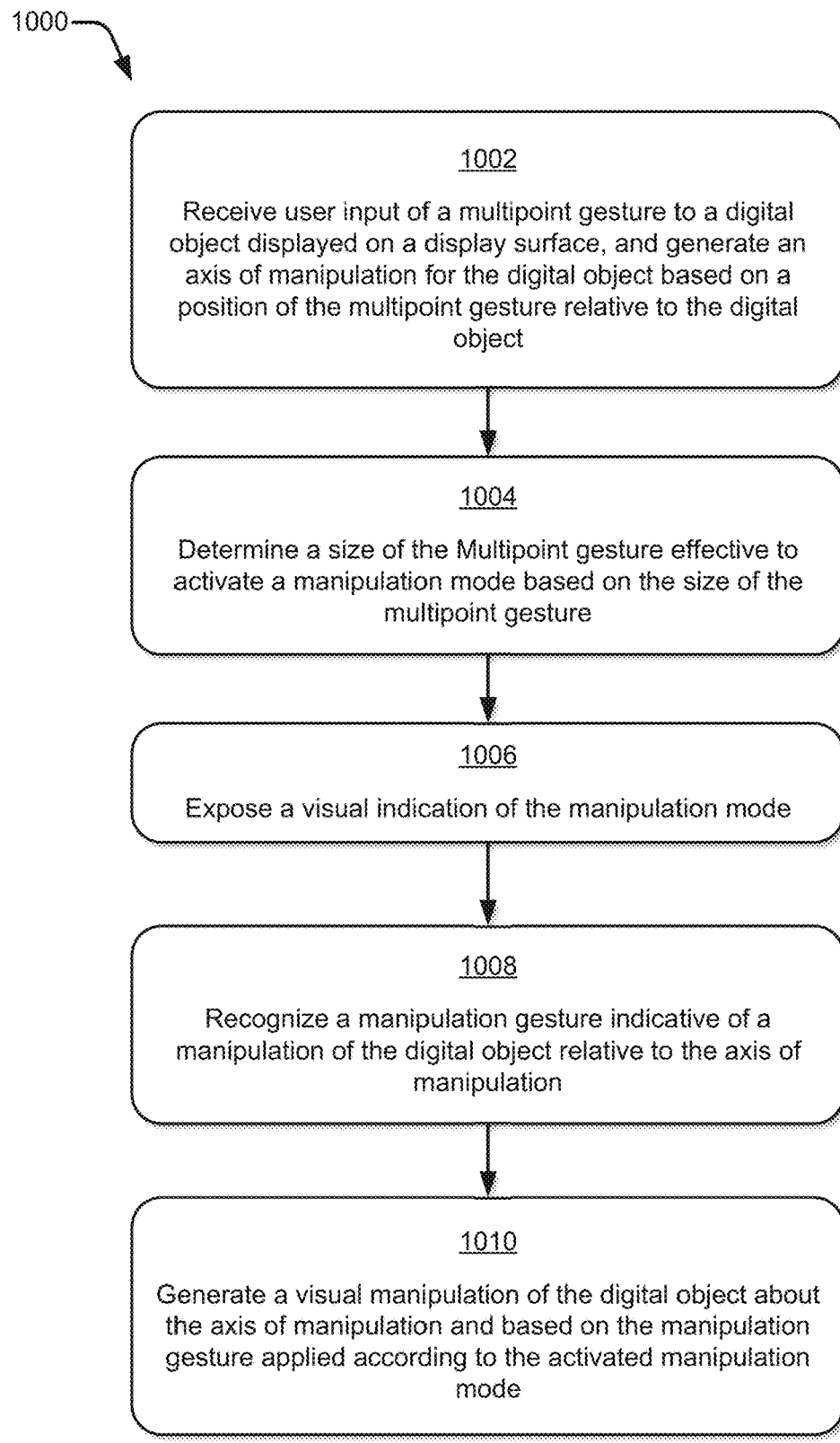
FIG. 10 depicts a procedure in an example implementation for generating a visual manipulation of a digital object about an axis of manipulation.
Figure 11:
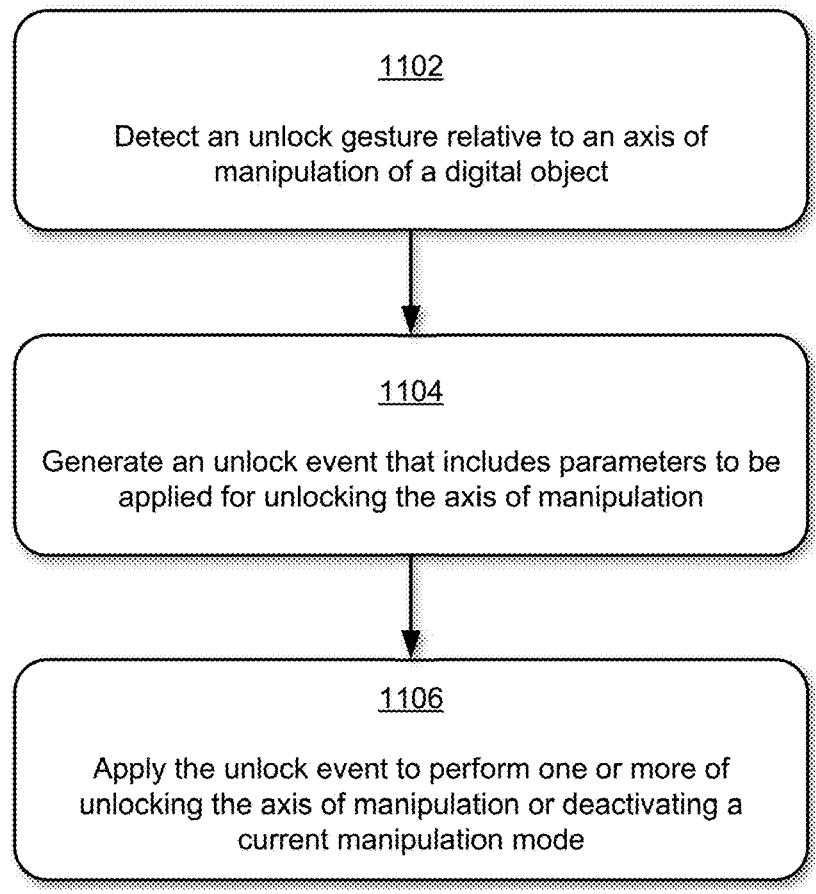
FIG. 11 depicts a procedure in an example procedure for unlocking an axis of manipulation and/or deactivating an active manipulation mode.

This section describes with reference to FIGS. 9-11 example procedures relating to facilitating visual manipulation of a digital object in one or more implementations. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as an example computing device 102 of FIG. 1 or 1202 of FIG. 12 using a gesture recognition module 108 and a visual manipulation module 110 of FIGS. 1 and 12.

FIG. 9 is a flow diagram that illustrates an example procedure 900 for facilitating visual manipulation of a digital object in accordance with one or more example implementations. At block 902, a user input of a multipoint gesture to a digital object displayed on a display surface is received. For example, the display surface 104 of the computing device 102 receives a two finger touch spreading gesture as illustrated in FIG. 3. As part of the spreading gesture, for instance, user touches the digital object 204 on the display surface 104 with their thumb and forefinger at touchpoints 302a and 302b, respectively. The user then moves their thumb and forefinger in opposite direction in a spreading gesture to input the multipoint gesture.

At block 904, an axis of manipulation for the digital object is generated based on a position of the multipoint gesture relative to the digital object. For example, as depicted in FIG. 3, when the user touches the digital object 204, in this case a playing card, with both their thumb and forefinger at points 302a and 302b and moves their thumb and forefinger in opposite directions in a spreading gesture, an axis of manipulation 214 is generated between the two touchpoints 302a and 302b and on the digital object 204 as shown.

At block 906, a manipulation gesture indicative of a manipulation of the digital object relative to the axis of manipulation is recognized. For example, as depicted in FIG. 4, using their forefinger, a user touches display surface 104 at touchpoint 402 and makes a swiping gesture perpendicular to the axis of manipulation 214 as shown. This perpendicular swiping gesture is recognized as a rotation gesture when in a rotation mode, for example, and intended to rotate the digital object 204 around the axis of manipulation 214.

At block 908, a visual manipulation of the digital object about the axis of manipulation is generated based on the manipulation gesture. For example, referring to FIG. 4, when a user touches the display surface 104 at touchpoint 402 and makes the swiping gesture perpendicular to the axis of manipulation 214, the digital object 204 is rotated around the axis of manipulation 214 as shown.

FIG. 10 is a flow diagram that illustrates an example procedure 1000 for facilitating visual manipulation of a digital object in accordance with one or more example implementations. At block 1002, a user's input of a multipoint gesture to a digital object displayed on a display surface is received, and an axis of manipulation for the digital object is generated based on a position of the multipoint gesture relative to the digital object. For instance, a display surface of a computing device can receive a multipoint gesture from a user touching the digital object, displayed on the display surface, from which an axis of manipulation is generated between the multiple points and on the digital object. For example, the display surface 104 of the computing device 102 can receive a two finger touch spreading gesture at touchpoints 302a and 302b as illustrated in FIG. 3. As the user moves their thumb and forefinger in opposite direction in a spreading gesture as shown, an axis of manipulation 214 is generated between the two touchpoints 302a and 302b and on the digital object 204.

At block 1004, a size of the multipoint gesture is determined and a manipulation mode activated based on the size of the multipoint gesture. For example, when a user moves their fingers apart in a spreading gesture the size of the finger spread gesture is determined and based on the size, a particular manipulation mode is activated as shown in FIGS. 7a, 7b, and 7c. For instance, a manipulation mode such as a rotation mode shown in FIG. 7a may be activated. Alternately or in addition, a folding, bending, wrapping or creasing mode may be activated depending on the size of the multipoint gesture. For example, FIG. 6 shows an object 204 being folded over the axis of manipulation 214 when a folding mode is activated.

At block 1006, a visual indication of the manipulation mode is exposed. For example, text describing the manipulation mode, such as rotation mode, is visible on the display surface. The heads-up notification 404, for instance, illustrated in FIG. 4 indicates by text that the manipulation mode is a rotation mode. Alternately or in addition, other indications may be exposed, such as icons, color coding, audible indications, and so forth.

At block 1008, a manipulation gesture indicative of a manipulation of the digital object relative to the axis of manipulation is recognized. For example, in FIG. 4, when in the rotation mode, a swiping gesture is made perpendicular to the axis of manipulation 214. The gesture recognition module 108 recognizes the gesture as a rotation gesture and thus generates the manipulation event 220 that includes various parameters for a rotating manipulation of the digital object 204.

At block 1010, a visual manipulation of the digital object about the axis of manipulation is generated based on the manipulation gesture applied according to the activated manipulation mode. For example, when the rotation mode is activated and the user makes the perpendicular swiping gesture shown in FIG. 4, the digital object 204 is rotated around the axis of manipulation 214 in the direction of the swiping gesture as shown. In at least one implementation, the rotating visual manipulation is performed by the visual manipulation module 110 and based on manipulation parameters specified by the manipulation event 220.

FIG. 11 is a flow diagram that illustrates an example procedure 1100 for unlocking an axis of manipulation and/or deactivating an active manipulation mode in accordance with one or more example implementations. At block 1102, an unlock gesture is detected relative to an axis of manipulation of a digital object. A user, for instance, applies an unlock gesture relative to an axis of manipulation while a manipulation mode is active, such as depicted in FIG. 8.

At block 1104, an unlock event is generated that includes parameters to be applied for unlocking the axis of manipulation. For example, the gesture recognition module 108 recognizes the unlock gesture and generates the unlock event as a data event that includes parameters for unlocking the axis of manipulation. The parameters, for instance, specify that the axis of manipulation is to be unlocked and made movable to different positions relative to the digital object. Alternatively or in addition, the parameters specify that the axis of manipulation is to be removed and/or that a current manipulation mode is to be deactivated.

At block 1106, the unlock event is applied to perform one or more of unlocking the axis of manipulation or deactivating a current manipulation mode. The gesture recognition module 108, for instance, applies the unlock event to enable the axis of manipulation to be movable to a different position relative to the digital object. Alternatively or in addition, the gesture recognition module 108 applies the unlock event to remove the axis of manipulation and/or deactivate a current manipulation mode. In an implementation where a current manipulation mode is deactivated, a user may subsequently apply a further multipoint gesture to active a further manipulation mode, such as using the techniques described herein.

Having described example procedures in accordance with one or more implementations, consider now an example system and device that can be utilized to implement the various schemes and techniques described herein.

Example System and Device

Figure 12:
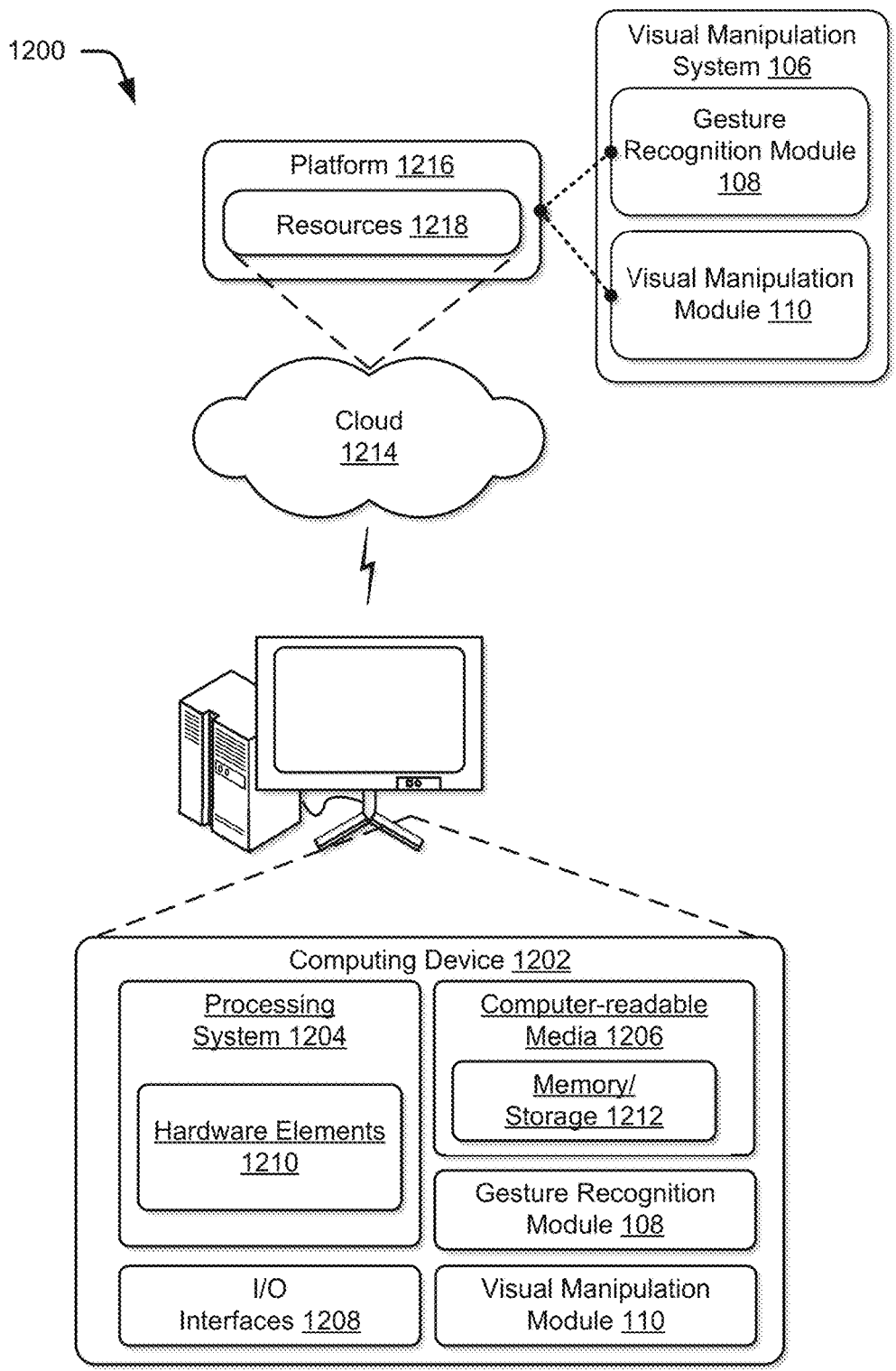
FIG. 12 illustrates an example system including various components of an example device that can be implemented as any type of computing device as described and/or utilized with reference to FIGS. 1-11 to perform implementations of techniques described herein.

FIG. 12 illustrates an example system generally at 1200 that includes an example computing device 1202 that is representative of one or more computing systems and/or devices that may implement the various techniques described herein. This is illustrated through inclusion of the visual manipulation system 106 including gesture recognition module 108 and visual manipulation module 110 which may operate as described herein above. The computing device 1202 may be, for example, a server of a service provider, a device associated with a client (e.g., a client device), an on-chip system, and/or any other suitable computing device or computing system.

In example implementations, the gesture recognition module 108 and the visual manipulation module 110 can be executing within a housing of the computing device 1202 or alternately they may be executing in the cloud (e.g., on a server or network-side computing device). Alternately, a portion of the gesture recognition module 108 and visual manipulation module 110 can be executing at both a client-side computing device and a server-side computing device. In such an implementation, the operations implemented by the gesture recognition module 108 and visual manipulation module 110 as described herein may be distributed across a client-server architecture.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RANI, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for visually manipulating a digital object implemented by at least one computing device in a digital visual manipulation environment, the method comprising:
    receiving, by the at least one computing device, user input of an activation gesture relative to the digital object displayed on a display surface;
    generating, by the at least one computing device, an axis of manipulation for the digital object based on a position of the activation gesture relative to the digital object;
    activating, by the at least one computing device, one of multiple manipulation modes that each indicate a different type of rotational movement of the digital object around the axis of manipulation based on a length of the activation gesture;
    detecting, by the at least one computing device, removal of the activation gesture, the activated manipulation mode remaining active when the activation gesture is removed; and
    receiving, by the at least one computing device, user input of a manipulation gesture causing a visual manipulation of the digital object around the axis of manipulation based on the activated manipulation mode.

2. The method as described in claim 1, wherein the axis of manipulation is locked at the position of the activation gesture relative to the digital object after detecting the removal of the activation gesture to facilitate the rotational movement around the positionally locked axis of manipulation while the activation gesture is removed.

3. The method as described in claim 1, wherein the activated manipulation mode is a wrapping mode, and the visual manipulation is a wrapping of the digital object around the axis of manipulation.

4. The method as described in claim 1, wherein a degree to which the digital object is visually manipulated around the axis of manipulation is based on a length of the manipulation gesture.

5. The method as described in claim 1, wherein a direction that the digital object is visually manipulated around the axis of manipulation corresponds to a direction of the manipulation gesture.

6. The method as described in claim 1, further comprising:
    receiving, by the at least one computing device, user input of an unlock gesture to the axis of manipulation visible on the display surface, the unlock gesture enabling movement of the axis of manipulation to a different position relative to the digital object.

7. The method as described in claim 6, further comprising:
    receiving, by the at least one computing device, user input of a reposition gesture to the axis of manipulation visible on the display surface, the reposition gesture moving the axis of manipulation to the different position relative to the digital object, and in response, generating the axis of manipulation at the different position relative to the digital object.

8. The method as described in claim 1, further comprising:
    receiving, by the at least one computing device, user input of a removal gesture to the axis of manipulation visible on the display surface, the removal gesture terminating the activated manipulation mode and removing the axis of manipulation.

9. In a digital visual environment for visually manipulating a digital object, a system to manipulate the digital object around an axis of manipulation, the system comprising:
    one or more processors; and
    one or more computer-readable storage media storing instructions that are executable by the one or more processors to:
        receive user input of an activation gesture relative to the digital object displayed on a display surface;
        generate the axis of manipulation for the digital object based on a position of the activation gesture relative to the digital object;
        activate one of multiple manipulation modes that each indicate a different type of rotational movement of the digital object around the axis of manipulation based on a length of the activation gesture;
        detect removal of the activation gesture, the activated manipulation mode remaining active when the activation gesture is removed; and
        receive user input of a manipulation gesture that causes a visual manipulation of the digital object around the axis of manipulation based on the activated manipulation mode.

10. The system as described in claim 9, wherein the axis of manipulation is locked at the position of the activation gesture relative to the digital object after detection of the removal of the activation gesture to facilitate the rotational movement around the positionally locked axis of manipulation while the activation gesture is removed.

11. The system as described in claim 9, wherein the activated manipulation mode is a wrapping mode, and the visual manipulation of the digital object causes the digital object to be wrapped around the axis of manipulation.

12. The system as described in claim 9, wherein a degree to which the digital object is visually manipulated around the axis of manipulation is based on a length of the manipulation gesture.

13. The system as described in claim 9, wherein a direction that the digital object is visually manipulated around the axis of manipulation corresponds to a direction of the manipulation gesture.

14. The system as described in claim 9, wherein the instructions are further executable by the one or more processors to receive user input of an unlock gesture to the axis of manipulation visible on the display surface that causes movement of the axis of manipulation to be enabled.

15. The system as described in claim 14, wherein the instructions are further executable by the one or more processors to receive user input of a reposition gesture to the axis of manipulation visible on the display surface that moves the axis of manipulation to a different position relative to the digital object, and in response, causes the axis of manipulation to be generated at the different position relative to the digital object.

16. The system as described in claim 9, wherein the instructions are further executable by the one or more processors to receive user input of a removal gesture to the axis of manipulation visible on the display surface that causes the activated manipulation mode to be terminated and the axis of manipulation to be removed.

17. A computer-implemented method for visually manipulating a digital object in a digital visual manipulation environment, comprising:
  generating, by at least one computing device, an axis of manipulation for the digital object responsive to detecting user input of an activation gesture relative to the digital object displayed on a display surface, the axis of manipulation generated at a position of the activation gesture relative to the digital object;
  activating, by the at least one computing device, one of multiple manipulation modes that each indicate a different type of rotational movement of the digital object around the axis of manipulation based on a length of the activation gesture, the activated manipulation mode remaining active when the activation gesture is removed; and
  visually manipulating, by the at least one computing device, the digital object around the axis of manipulation responsive to receiving a manipulation gesture and based on the activated manipulation mode.

18. The computer-implemented method as described in claim 17, wherein the axis of manipulation is locked at the position of the activation gesture relative to the digital object after detecting removal of the activation gesture to facilitate the rotational movement around the positionally locked axis of manipulation while the activation gesture is removed.

19. The computer-implemented method as described in claim 17, further comprising:
  generating, by the at least one computing device, the axis of manipulation at a different position relative to the digital object responsive to receiving user input of an unlock gesture and a subsequent reposition gesture to the axis of manipulation visible on the display surface, the unlock gesture enabling movement of the axis of manipulation, and the reposition gesture moving the axis of manipulation to the different position relative to the digital object.

20. The computer-implemented method as described in claim 17, further comprising:
  terminating, by the at least one computing device, the activated manipulation mode and removing, by the at least one computing device, the axis of manipulation responsive to receiving user input of a removal gesture to the axis of manipulation visible on the display surface.

* * * * *